United States Patent
Atsuumi et al.

(10) Patent No.: US 6,785,028 B1
(45) Date of Patent: Aug. 31, 2004

(54) OPTICAL SCANNING DEVICE HAVING A TEMPERATURE COMPENSATION UNIT

(75) Inventors: Hiromichi Atsuumi, Kanagawa (JP); Seizo Suzuki, Kanagawa (JP); Satoru Itoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/716,949

(22) Filed: Nov. 22, 2000

(30) Foreign Application Priority Data

Nov. 24, 1999 (JP) ............................................ 11-333510
Feb. 1, 2000 (JP) ....................................... 2000-023930

(51) Int. Cl.⁷ .............................................. G02B 26/08
(52) U.S. Cl. ........................ 359/196; 359/210; 359/900; 250/235; 250/201.4
(58) Field of Search ................................ 359/209, 210, 359/212–219, 822, 823, 196, 197, 900; 347/257–261; 250/234–236, 201.2, 201.4

(56) References Cited

U.S. PATENT DOCUMENTS

| | | | |
|---|---|---|---|
| 5,233,454 A | 8/1993 | Sakuma et al. | |
| 5,355,244 A | 10/1994 | Suzuki et al. | |
| 5,408,095 A | 4/1995 | Atsuumi et al. | |
| 5,426,298 A | 6/1995 | Sakuma et al. | |
| 5,459,601 A | 10/1995 | Suzuki et al. | |
| 5,475,522 A | 12/1995 | Itabashi et al. | |
| 5,504,613 A | 4/1996 | Itabashi et al. | |
| 5,546,216 A | 8/1996 | Suzuki | |
| 5,557,448 A | 9/1996 | Endo et al. | |
| 5,570,224 A | 10/1996 | Endo et al. | |
| 5,581,392 A | 12/1996 | Hayashi | |
| 5,652,670 A | 7/1997 | Hayashi | |
| 5,684,618 A | 11/1997 | Atsuumi | |
| 5,717,511 A | 2/1998 | Suzuki | |
| 5,786,594 A | 7/1998 | Ito et al. | |
| 5,875,051 A | 2/1999 | Suzuki et al. | |
| 5,986,791 A | 11/1999 | Suzuki et al. | |
| 5,999,345 A | 12/1999 | Nakajima et al. | |
| 6,069,724 A | 5/2000 | Hayashi et al. | |
| 6,078,419 A | 6/2000 | Atsuumi | |
| 6,081,386 A | 6/2000 | Hayashi et al. | |
| 6,104,522 A | 8/2000 | Hayashi et al. | |
| 6,141,133 A | 10/2000 | Suzuki et al. | |
| 6,166,842 A | 12/2000 | Aoki et al. | |
| 6,185,026 B1 | 2/2001 | Hayashi et al. | |
| 6,188,086 B1 | 2/2001 | Masuda et al. | |
| 6,198,562 B1 | 3/2001 | Hayashi et al. | |
| 6,198,563 B1 | 3/2001 | Atsuumi | |
| 6,222,662 B1 | 4/2001 | Suzuki et al. | |
| 6,233,081 B1 | 5/2001 | Suzuki et al. | |
| 6,239,860 B1 | 5/2001 | Ito | |

(List continued on next page.)

FOREIGN PATENT DOCUMENTS

JP  4-107581  4/1992
JP  2692944   9/1997

*Primary Examiner*—James Phan
(74) *Attorney, Agent, or Firm*—Oblon, Spivak, McClelland, Maier & Neustadt, P.C.

(57) ABSTRACT

In an optical scanning device and image forming apparatus according to the present invention, a light source emits a light beam, and a scanning optical unit deflects the light beam from the light source and focuses the deflected light beam to form a light spot on a scanned surface, the scanned surface being scanned by the light beam from the scanning optical unit. A temperature detection unit detects a temperature of the scanning optical unit and its neighboring locations. A temperature compensation unit adjusts a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change.

6 Claims, 11 Drawing Sheets

U.S. PATENT DOCUMENTS

| | | |
|---|---|---|
| 6,256,133 B1 | 7/2001 | Suzuki et al. |
| 6,288,819 B1 | 9/2001 | Aoki et al. |
| 6,347,004 B1 | 2/2002 | Suzuki et al. |
| 6,348,988 B2 | 2/2002 | Aoki et al. |
| 6,348,989 B2 | 2/2002 | Aoki et al. |
| 6,353,203 B1 * | 3/2002 | Hokodate et al. ...... 219/121.67 |
| 6,359,717 B2 | 3/2002 | Suzuki et al. |
| 6,366,384 B1 | 4/2002 | Aoki et al. |
| 6,376,837 B1 | 4/2002 | Itabashi et al. |
| 6,384,949 B1 | 5/2002 | Suzuki |
| 6,417,509 B1 | 7/2002 | Atsuumi et al. |
| 6,498,617 B1 | 12/2002 | Ishida et al. |

* cited by examiner

OPTICAL SCANNING DEVICE HAVING A TEMPERATURE COMPENSATION UNIT

BACKGROUND OF THE INVENTION

1. Field of The Invention

The present invention relates to an optical scanning device in which a scanning optical unit that emits a light beam and focuses it on a scanned surface is provided with a temperature-compensation unit that eliminates a scanned-surface focal-point deviation of the light beam focused by the scanning optical unit, due to a temperature change of the scanning optical unit and its neighboring locations. Further, the present invention relates to an image forming apparatus in which the optical scanning device is provided with the temperature-compensation unit.

2. Description of The Related Art

In an image forming apparatus, such as laser printer, digital copier or laser facsimile, a laser scanning device emits a laser beam in accordance with an image signal, and focuses the laser beam onto a scanned surface of a photosensitive medium. In the laser scanning device, a collimator lens converts the laser beam, emitted by the laser light source, into a collimated laser beam, and a rotary polygonal mirror, which is rotated at a high speed, deflects the collimated laser beam to the photosensitive medium. The deflected beam is passed through fθ lens, and the fθ lens focuses the deflected beam to form a light spot on the photosensitive medium surface. In the above laser scanning device, the collimator lens, the rotary polygonal mirror, and the fθ lens constitute the scanning optical unit.

In an image forming apparatus including the laser scanning device, the photosensitive medium surface is scanned in a main scanning direction by the laser beam from the laser scanning device. In a synchronous manner with the time the main scanning is performed, the photosensitive medium is rotated around its rotation axis, and the photosensitive medium surface is scanned in a sub-scanning direction by the laser beam from the laser scanning device. Hence, in the image forming apparatus, an electrostatic image is formed on the photosensitive medium surface by using the laser scanning device.

When the optical scanning device, like the above laser scanning device, is actually operated over an extended period of time, it is inevitable that a scanned-surface focal-point position of the light beam focused by the scanning optical unit deviates from a design-value position due to environmental changes, in particular, due to temperature changes of the scanning optical unit and its neighboring locations. In a certain case, the temperature changes cause the thermal deformation of the elements of the optical scanning device, and the light spot, which is formed on the scanned surface by the scanning optical unit, is larger than a required diameter. The contrast of the resulting image on the scanned surface will be lowered due to the focal-point deviation of the laser beam, and this will degrade the quality of the resulting image that is formed by the image forming apparatus using the optical scanning device.

As disclosed in Japanese Patent Publication No.2692944, a scanning optical device that is provided with a temperature compensation unit for eliminating a scanned-surface focal-point deviation of the light beam due to a temperature change of the scanning optical device is known. In the temperature compensation unit of the above document, a focusing-condition detection means detects a focusing condition of the laser beam on the scanned surface and outputs a detection signal indicative of the focusing condition. A corrector lens is movably provided in the collimator lens of the scanning optical device. When a temperature detection means detects a temperature change of the scanning optical device, movement of the corrector lens along the optical axis relative to the scanned surface is controlled by a feedback loop based on the focusing-condition detection signal, until the focusing-condition detection means detects a desired focusing condition of the laser beam on the scanned surface in which the focal-point deviation of the light beam is cancelled. Alternatively, the temperature compensation unit of the above document may be achieved by either the movement of the collimator lens along the optical axis or the movement of the laser light source.

Further, as disclosed in Japanese Laid-Open Patent Application No.4-107581, a scanning optical device that is provided with a temperature compensation unit is known. In the conventional temperature compensation unit of the above document, a focusing-condition detection means detects a focusing condition of the laser beam on the scanned surface of a photosensitive medium by outputting a detection signal indicating the focusing condition. A temperature control means, including the Peltier element, is provided on the laser light source. An automatic focusing device including a corrector lens movably provided therein is operated in response to a control signal output by the temperature control means, and the automatic focusing operation of the automatic focusing device is controlled in response to the detection signal output by the focusing-condition detection means, such that the corrector lens is moved along the optical axis by the automatic focusing device and the focusing-condition detection means detects a desired focusing condition of the laser beam on the scanned surface.

However, in the conventional scanning optical devices of the above documents, when a temperature change of the scanning optical device is detected, the automatic focusing operation must be performed to attain the desired focusing condition of the laser beam on the scanned surface. The configuration of the conventional scanning optical devices and the automatic focusing operation thereof are complicated, and much time is taken to reach the desired focusing condition of the laser beam by the automatic focusing operation. Further, the movement of the corrector lens is directed to elimination of only one of a main-scanning-direction focal-point deviation and a sub-scanning-direction focal-point deviation caused by the temperature change. If a focal-point position of the laser beam on the scanned surface that is optimum with respect to the main-scanning direction can be achieved, the resulting focal-point position of the laser beam on the scanned surface is not necessarily suitable with respect to the sub-scanning direction.

SUMMARY OF THE INVENTION

Accordingly, it is a general object of the present invention to provide an improved optical scanning device in which the above-described problems are eliminated.

Another object of the present invention is to provide an optical scanning device which includes a simple, low-cost temperature compensation unit that can quickly achieve the optimum focal-point position of the light beam on the scanned surface by eliminating the focal-point deviation due to temperature changes without performing the automatic focusing operation.

Another object of the present invention is to provide an image forming apparatus in which an optical scanning device is provided with a simple, low-cost temperature compensation unit that can quickly achieve the optimum focal-point position of the light beam on the scanned surface by eliminating the deviation due to temperature changes without performing the automatic focusing operation.

The above-mentioned objects of the present invention are achieved by an optical scanning device including: a light source which emits a light beam; a scanning optical unit which deflects the light beam from the light source and focuses the deflected light beam to form a light spot on a scanned surface, the scanned surface being scanned by the light beam from the scanning optical unit; a temperature detection unit which detects a temperature of the scanning optical unit and its neighboring locations; and a temperature compensation unit which adjusts a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change.

The above-mentioned objects of the present invention are achieved by an optical scanning device which includes: a light source unit which has a plurality of light sources emitting multiple light beams; a scanning optical unit which deflects the multiple light beams from the light sources at a single location and focuses the deflected light beam to form a light spot on a scanned surface of a photosensitive medium, the scanned surface being scanned by the light beam from the scanning optical unit; a temperature detection unit which detects a temperature of the scanning optical unit and its neighboring locations; and a temperature compensation unit which adjusts each of a main-scanning-direction focal-point position, a sub-scanning-direction focal-point position and a sub-scanning-direction beam pitch related to the light beam on the scanned surface in accordance with a change in the temperature detected by the temperature detection unit.

The above-mentioned objects of the present invention are achieved by an image forming apparatus in which an optical scanning device is provided, the optical scanning device including: a light source which emits a light beam; a scanning optical unit which deflects the light beam from the light source and focuses the deflected light beam to form a light spot on a scanned surface, the scanned surface being scanned by the light beam from the scanning optical unit; a temperature detection unit which detects a temperature of the scanning optical unit and its neighboring locations; and a temperature compensation unit which adjusts a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change.

The above-mentioned objects of the present invention are achieved by an image forming apparatus in which an optical scanning device is provided, the optical scanning device including: a light source unit which has a plurality of light sources emitting multiple light beams; a scanning optical unit which deflects the multiple light beams from the light sources at a single location and focuses the deflected light beam to form a light spot on a scanned surface of a photosensitive medium, the scanned surface being scanned by the light beam from the scanning optical unit; a temperature detection unit which detects a temperature of the scanning optical unit and its neighboring locations; and a temperature compensation unit which adjusts each of a main-scanning-direction focal-point position, a sub-scanning-direction focal-point position and a sub-scanning-direction beam pitch related to the light beam on the scanned surface in accordance with a change in the temperature detected by the temperature detection unit.

In the optical scanning device and the image forming apparatus according to the present invention, the temperature compensation unit adjusts the scanned-surface focal-point position of the light beam by directly varying the focusing effect of the corrector lens on the light beam from the light source by a controlled amount of movement of the corrector lens along its optical axis that corresponds to the temperature change. The temperature compensation unit of the present invention can be constructed in a simple, inexpensive configuration. The temperature compensation unit of the present invention is effective in quickly achieving the optimum focal-point position of the light beam on the scanned surface by eliminating the focal-point deviation due to a temperature change of the scanning optical unit. It is not necessary for the optical scanning device of the present invention to perform the automatic focusing operation when the temperature of the scanning optical unit changes, as in the conventional optical scanning devices.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the optical scanning device and the image forming apparatus of the present invention with reference to the accompanying drawings.

Figure 1:
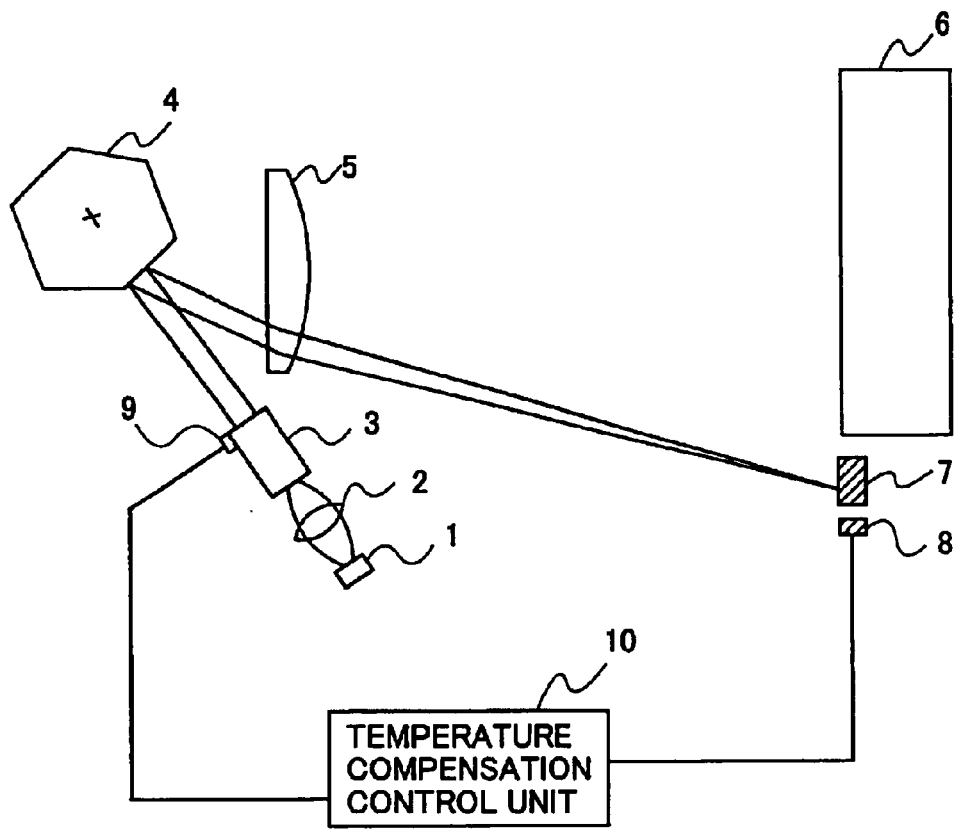
FIG. 1 is a schematic diagram showing a first preferred embodiment of the optical scanning device of the present invention.

FIG. 1 shows a first preferred embodiment of the optical scanning device of the present invention. The optical scanning device of the present embodiment is provided for use in an image forming apparatus, such as a laser printer, a digital copier or a laser facsimile. In the image forming apparatus, an image is formed on a scanned surface of a photosensitive medium when the photosensitive medium surface is scanned in the main scanning direction and the sub-scanning direction by the light beam focused by the optical scanning device.

As shown in FIG. 1, the optical scanning device of the present embodiment generally comprises a light source 1, a coupling lens 2, a corrector lens 3, a deflector 4, a focusing lens system 5, a photosensitive medium 6, a sync signal detector 7, a temperature sensor 8, a corrector lens actuator 9, and a temperature compensation control unit 10. In the optical scanning device of FIG. 1, the coupling lens 2, the deflector 4 and the focusing lens system 5 constitute the scanning optical unit in the claims, while the corrector lens 3, the corrector lens actuator 9 and the temperature compensation control unit 10 constitute the temperature compensation unit in the claims.

In the optical scanning device of FIG. 1, the light source 1 emits a light beam, such as a laser beam, in accordance with an image signal. The light source 1 in the present embodiment is a semiconductor laser (or a laser diode) that emits a laser beam. The coupling lens 2 couples the light beam emitted by the light source 1, and the coupled light beam is suitably introduced to the corrector lens 3.

The corrector lens 3 provides a refraction power to the coupled light beam from the coupling lens 2, with respect to both the main scanning direction and the sub-scanning direction. In the present embodiment, the focusing effect of the corrector lens 3 on the light beam from the light source 1 is varied by the corrector lens actuator 9 by a controlled amount of movement of the corrector lens 3 along its optical axis that corresponds to a detected temperature change. The movement of the corrector lens 3 by the corrector lens actuator 9 is controlled by the temperature compensation control unit 10 in accordance with the temperature change. Accordingly, the focal-point position of the light beam on the scanned surface of the photosensitive medium 6 is adjusted by the temperature compensation control unit 10 in accordance with the temperature change, so as to eliminate the focal-point deviation due to the temperature change.

The deflector 4 in the present embodiment is a rotary polygonal mirror having reflection surfaces on the six peripheral sides. One of the reflection surfaces of the deflector 4 deflects the beam from the corrector lens 3 while the deflector 4 is rotated around its rotation axis (which is perpendicular to the plane of illustration of FIG. 1). The deflected beam from the deflector 4 scans the scanned surface of the photosensitive medium 6 in the main scanning direction (which is parallel to the axial direction of the photosensitive medium 6). In a synchronous manner with the time the main scanning is performed (or every time the light beam from the deflector 4 is incident to the sync signal detector 7), the photosensitive medium 6 is rotated around its rotation axis by a given rotational angle. Hence, the photosensitive medium surface is scanned in the main scanning direction and in the sub-scanning direction by the light beam focused by the optical scanning device.

The focusing lens system 5 includes an fθ lens that converts the deflected light beam from the deflector 4 into a convergent light beam so that the convergent light beam from the focusing lens system 5 forms a light spot on the scanned surface of the photosensitive medium 6. When the deflector 4 is rotated, the light beam passed through the focusing lens system 5 scans the photosensitive medium surface in the main scanning direction.

The photosensitive medium 6 in the present embodiment is a photoconductor drum that serves as an image support for an image on the scanned surface. An electrostatic latent image is formed on the scanned surface of the photosensitive medium 6 when the photosensitive medium surface is exposed to a pattern of the light beam focused by the optical scanning device.

The sync signal detector 7 outputs a main-scanning sync signal every time the light beam from the deflector 4 is incident to the sync signal detector 7 during the rotation of the deflector 4. The photosensitive medium 6 is rotated around the rotation axis by the given rotational angle in synchronism with the main-scanning sync signal output by the sync signal detector 7.

The temperature sensor 8 is provided in the vicinity of the sync signal detector 7. The temperature sensor 8 outputs a signal indicative of a temperature of the scanning optical unit and its neighboring locations, to the temperature-compensation control unit 10. When the temperature sensor 8 senses a first temperature of the scanning optical unit, the output signal of the temperature sensor 8 represents a first voltage or resistance of a thermoelectric element contained in the temperature sensor 8. When the temperature of the scanning optical unit changes to a second temperature and it is sensed by the temperature sensor 8, the output signal of the temperature sensor 8 represents a second voltage or resistance of the thermoelectric element. Hence, the temperature change is detected by the temperature-compensation control unit 10 from a change of the voltage or resistance of the thermoelectric element indicated by the output signal of the temperature sensor 8.

The temperature compensation control unit 10 outputs a control signal to the corrector lens actuator 9 in accordance with the signal supplied from the temperature sensor 8, the control signal indicating a controlled amount of movement of the corrector lens 3 required to cancel the focal-point deviation of the light beam due to the temperature change. The corrector lens actuator 9 moves the corrector lens 3 along the optical axis in accordance with the control signal supplied from the temperature compensation control unit 10. Therefore, the temperature compensation control unit 10 controls the movement of the corrector lens 3 by means of the corrector lens actuator 9 in accordance with the temperature change detected by the temperature sensor 8, and the focal-point position of the light spot on the scanned surface of the photosensitive medium 6 is adjusted by the temperature compensation control unit 10 so as to eliminate the focal-point deviation caused by the temperature change.

In the present embodiment, the temperature-compensation control unit 10 includes a memory that stores a table defining the relationship between the temperature change and a corresponding focal-point deviation of the light beam on the scanned surface. A simulation test of the optical scanning device of the present embodiment is performed, in advance, and individual scanned-surface focal-point deviations of the laser beam focused by the scanning optical unit are measured at different temperatures of the scanning optical unit. The table defining the above relationship is created based on the results of the measurement of the simulation test, and stored in the memory of the temperature-compensation control unit 10. During the measurement of the simulation test, the focusing effect of the corrector lens 3 on the light beam from the light source 1 is fixed to a reference level and not varied.

Figure 2:
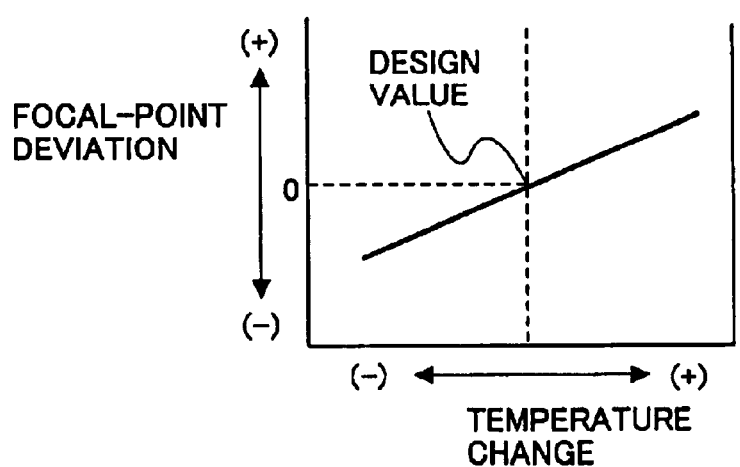
FIG. 2 is a diagram for explaining focal-point deviation characteristics of the optical scanning device of the present embodiment that are dependent on a temperature change.

FIG. 2 shows focal-point deviation characteristics of the optical scanning device of the present embodiment that are dependent on a temperature change of the scanning optical unit.

As described above, in the present embodiment, the simulation test is performed, in advance, such that individual scanned-surface focal-point deviations of the laser beam focused by the scanning optical unit are measured at different temperatures of the scanning optical unit. The table defining the above relationship is created based on the results of the measurement of the simulation test, and the table, such as shown in FIG. 2, is stored in the memory of the temperature-compensation control unit 10.

In the optical scanning device of FIG. 1, when a temperature change of the scanning optical unit is detected by the temperature sensor 8, the temperature compensation control unit 10 adjusts the scanned-surface focal-point position of the light beam based on the focal-point deviation read from the table of the above memory in response to the temperature change. Specifically, the temperature compensation control unit 10 directly controls the corrector lens actuator 9 in accordance with the signal output from the temperature sensor 8, so that the focusing effect of the corrector lens 3 on the light beam from the light source 1 is directly varied by a controlled amount of movement of the corrector lens 3 along the optical axis that corresponds to the temperature change.

It is not necessary for the optical scanning device of the present embodiment to perform the automatic focusing operation when the temperature of the scanning optical unit changes. In the present embodiment, it is possible to provide one-to-one correspondence between the temperature of the scanning optical unit and the corresponding amount of movement of the corrector lens 3. The movement of the corrector lens 3 controlled by the temperature compensation control unit 10 results in the elimination of the focal-point deviation corresponding to that read from the memory. In the optical scanning device of the present embodiment, the temperature sensor 8, the corrector lens actuator 9 and the temperature compensation control unit 10 can be constructed in a simple, inexpensive configuration. The optical scanning device and the image forming apparatus of the present embodiment are effective in quickly achieving the optimum focal-point position of the light beam on the scanned surface of the photosensitive medium 6 when a temperature change of the scanning optical unit is detected.

In the above-described embodiment, the temperature sensor 8 is provided in the vicinity of the sync signal detector 7 as shown in FIG. 1. Alternatively, the temperature sensor 8 may be provided in the vicinity of the focusing lens system 5 or in the vicinity of the light source 1 which is subjected to significant temperature changes. Further, in order to increase the accuracy of temperature detection, a plurality of temperature sensors may be provided at different internal locations within the optical scanning device which are subjected to significant temperature changes.

Figure 3:
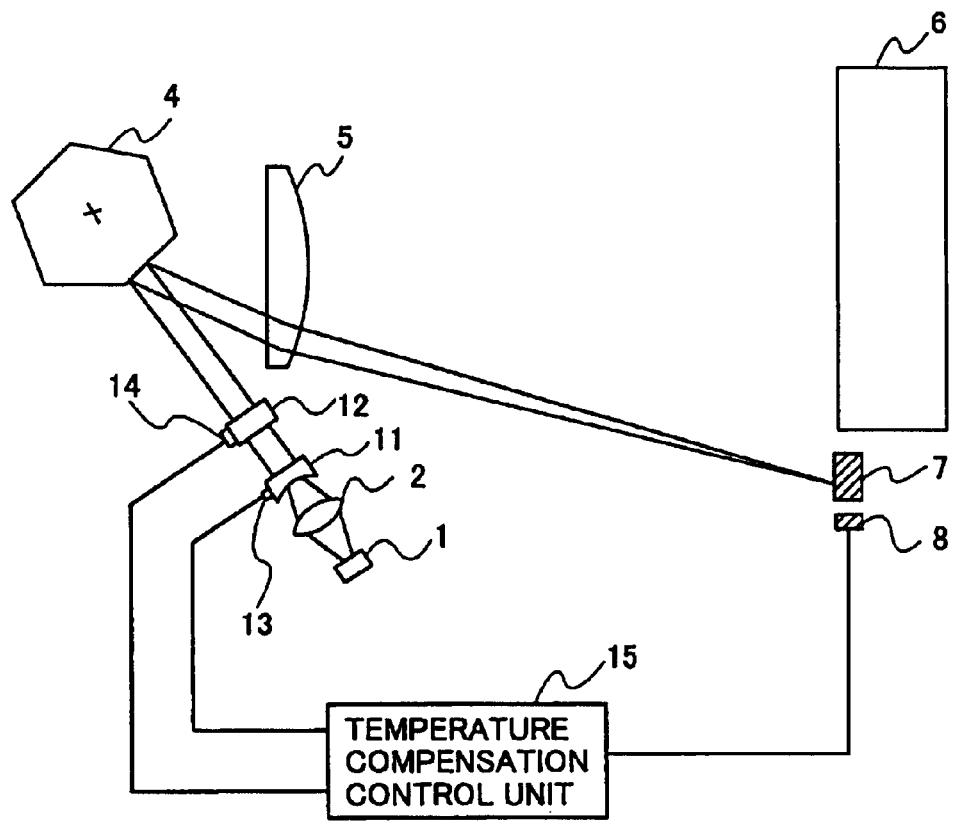
FIG. 3 is a schematic diagram showing a second preferred embodiment of the optical scanning device of the present invention.

Next, FIG. 3 shows a second preferred embodiment of the optical scanning device of the present invention.

As shown in FIG. 3, the optical scanning device of the present embodiment generally comprises the light source 1, the coupling lens 2, a first corrector lens 11, a second corrector lens 12, the deflector 4, the focusing lens system 5, the photosensitive medium 6, the sync signal detector 7, the temperature sensor 8, a first corrector lens actuator 13, a second corrector lens actuator 14, and a temperature compensation control unit 15. In FIG. 3, the elements which are essentially the same as corresponding elements in FIG. 1 are designated by the same reference numerals, and a description thereof will be omitted.

In the optical scanning device of FIG. 3, the coupling lens 2, the deflector 4 and the focusing lens system 5 constitute the scanning optical unit in the claims, while the first and second corrector lenses 11 and 12, the first and second corrector lens actuators 13 and 14 and the temperature compensation control unit 15 constitute the temperature compensation unit in the claims.

In the optical scanning device of FIG. 3, the coupling lens 2 couples the light beam emitted by the light source 1, and the coupled light beam is suitably introduced to the first corrector lens 11.

The first corrector lens 11 provides a refraction power to the coupled light beam from the coupling lens 2, with respect to the main scanning direction. The second corrector lens 12 provides a refraction power to the coupled light beam from the coupling lens 2, with respect to the sub-scanning direction. In the present embodiment, the focusing effects of the corrector lenses 11 and 12 on the light beam from the light source 1 with respect to the main scanning direction and the sub-scanning direction are individually varied by the first and second corrector lens actuators 13 and 14 by controlled amounts of movement of the corrector lenses 11 and 12 along the optical axis that correspond to a detected temperature change. The movements of the corrector lenses 11 and 12 by the first and second corrector lens actuators 13 and 14 are individually controlled by the temperature compensation control unit 15 in accordance with the temperature change. Accordingly, the main-scanning-direction and sub-scanning-direction focal-point positions of the light beam on the scanned surface of the photosensitive medium 6 are adjusted by the temperature compensation control unit 15 in accordance with the temperature change, so as to eliminate the focal-point deviations due to the temperature change.

The temperature compensation control unit 15 outputs a first control signal and a second control signal to the first corrector lens actuator 13 and the second corrector lens actuator 14, respectively, in accordance with the signal supplied from the temperature sensor 8. The first control signal output by the control unit 15 indicates a controlled amount of movement of the first corrector lens 11 required to cancel the focal-point deviation of the light beam in the main scanning direction due to the temperature change. The second control signal output by the control unit 15 indicates a controlled amount of movement of the second corrector lens 12 required to cancel the focal-point deviation of the light beam in the sub-scanning direction due to the temperature change. The first corrector lens actuator 13 moves the first corrector lens 11 along the optical axis in accordance with the first control signal supplied from the temperature compensation control unit 15. The second corrector lens actuator 14 moves the second corrector lens 12 along the optical axis in accordance with the second control signal supplied from the temperature compensation control unit 15. The temperature compensation control unit 15 individually controls the movement of the first corrector lens 11 and the movement of the second corrector lens 12 in accordance with the temperature change detected by the temperature sensor 8. Therefore, the main-scanning-direction and sub-scanning-direction focal-point positions of the light beam on the scanned surface of the photosensitive medium 6 are adjusted by the temperature compensation control unit 15 so as to eliminate the focal-point deviations of the light beam with respect to the main scanning direction and the sub-scanning direction.

In the present embodiment, the temperature-compensation control unit 15 includes a memory that stores a table defining the relationship between the temperature change and corresponding focal-point deviations (with respect to the main scanning direction and the sub-scanning direction) of the light beam on the scanned surface. A simulation test of the optical scanning device of the present embodiment is performed, in advance, and individual scanned-surface focal-point deviations of the laser beam focused by the scanning optical unit are measured at different temperatures of the scanning optical unit. The table defining the above relationship is created based on the results of the measurement of the simulation test, and stored in the memory of the temperature-compensation control unit 15. During the measurement of the simulation test, the focusing effects of the corrector lenses 11 and 12 on the light beam from the light source 1 are fixed to a reference level and not varied.

Figure 4:
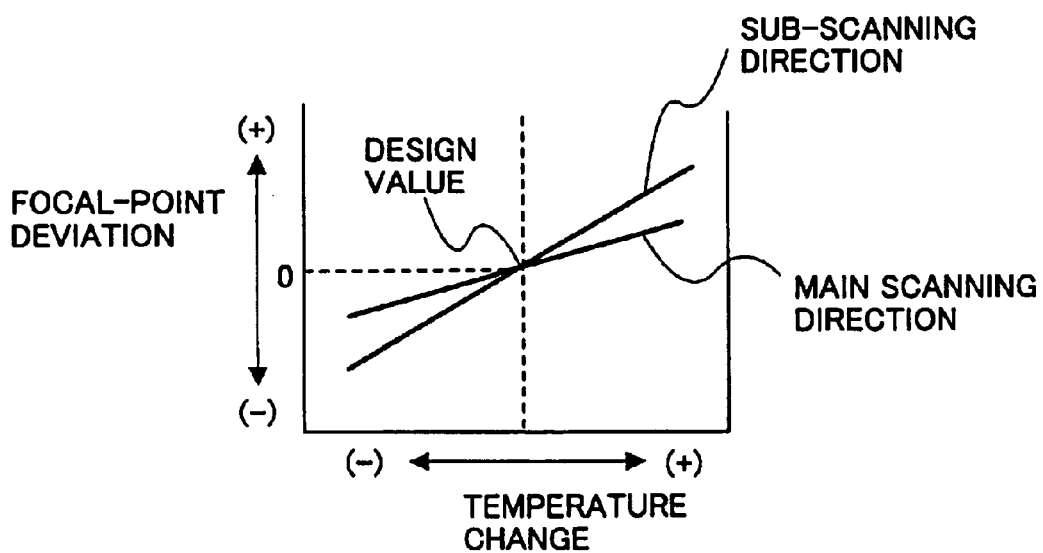
FIG. 4 is a diagram for explaining focal-point deviation characteristics of the optical scanning device of the present embodiment that are dependent on a temperature change.

FIG. 4 shows focal-point deviation characteristics of the optical scanning device of the present embodiment that are dependent on a temperature change of the scanning optical unit.

Figure 5:
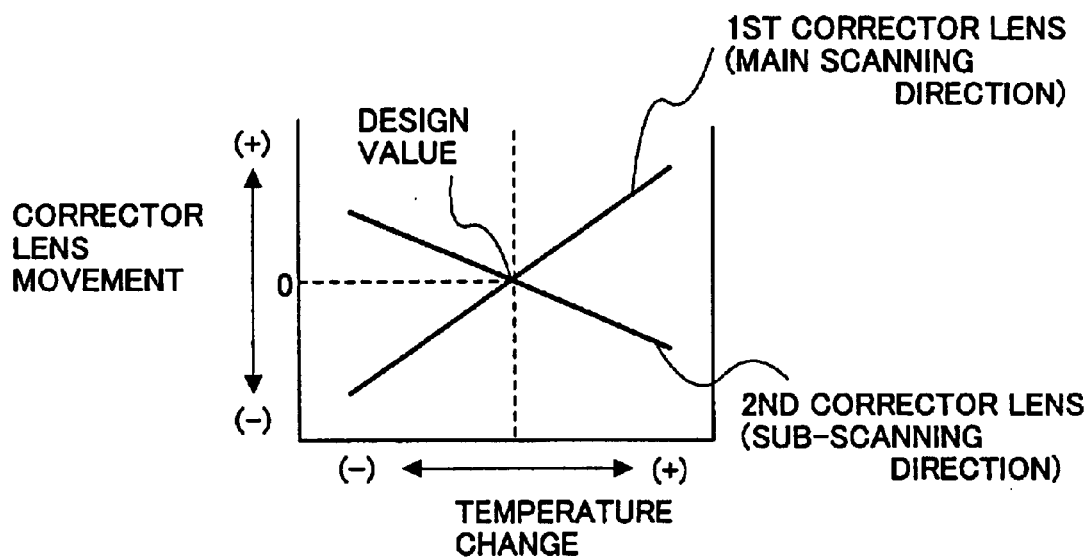
FIG. 5 is a diagram for explaining corrector lens movement characteristics of the optical scanning device of the present embodiment that are dependent on a temperature change.

FIG. 5 shows corrector lens movement characteristics of the optical scanning device of the present embodiment that are dependent on a temperature change of the scanning optical unit.

As described above, in the present embodiment, the simulation test is performed, in advance, such that individual scanned-surface focal-point deviations (with respect to the main scanning direction and the sub-scanning direction) of the laser beam focused by the scanning optical unit are measured at different temperatures of the scanning optical unit. The table defining the above relationship is created based on the results of the measurement of the simulation test, and the table, such as shown in FIG. 4, is stored in the memory of the temperature-compensation control unit 15.

Alternatively, the simulation test may be performed, in advance, such that individual controlled amounts of movement of each of the first corrector lens 11 and the second corrector lens 12 are calculated with respect to the respective focal-point deviations measured at different temperatures of the scanning optical unit. In such alternative embodiment, the table defining the above relationship is created based on the results of the measurement of the simulation test, and the table, such as shown in FIG. 5, is stored in the memory of the temperature-compensation control unit 15.

In the optical scanning device of FIG. 3, when a temperature change of the scanning optical unit is detected by the temperature sensor 8, the temperature compensation control unit 15 adjusts the main-scanning-direction and sub-scanning-direction focal-point positions of the light beam based on the focal-point deviations read from the table of the memory (FIG. 4) in response to the temperature change. Specifically, the temperature compensation control unit 15 directly controls the corrector lens actuators 13 and 14 in accordance with the signal output from the temperature sensor 8, so that the focusing effects of the corrector lenses 11 and 12 on the light beam from the light source 1 are directly varied by the controlled amounts of movement of the first and second corrector lenses 11 and 12 along the optical axis that correspond to the temperature change.

It is not necessary for the optical scanning device of the present embodiment to perform the automatic focusing operation when the temperature of the scanning optical unit changes. In the present embodiment, it is possible to provide one-to-one correspondence between the temperature of the scanning optical unit and the corresponding amount of movement of each of the corrector lenses 11 and 12. The movements of the corrector lenses 11 and 12 controlled by the temperature compensation control unit 15 result in the elimination of the focal-point deviations corresponding to those read from the memory. In the optical scanning device of the present embodiment, the temperature sensor 8, the corrector lens actuators 13 and 14 and the temperature compensation control unit 15 can be constructed in a simple, inexpensive configuration. The optical scanning device and the image forming apparatus of the present embodiment are effective in quickly achieving the optimum focal-point position of the light beam on the scanned surface of the photosensitive medium 6 when a temperature change of the scanning optical unit is detected.

In the above-described embodiment, the temperature sensor 8 is provided in the vicinity of the sync signal detector 7 as shown in FIG. 3. Alternatively, the temperature sensor 8 may be provided in the vicinity of the focusing lens system 5 or in the vicinity of the light source 1 which is subjected to significant temperature changes. Further, in order to increase the accuracy of temperature detection, a plurality of temperature sensors may be provided at different internal locations within the optical scanning device which are subjected to significant temperature changes.

Figure 6:
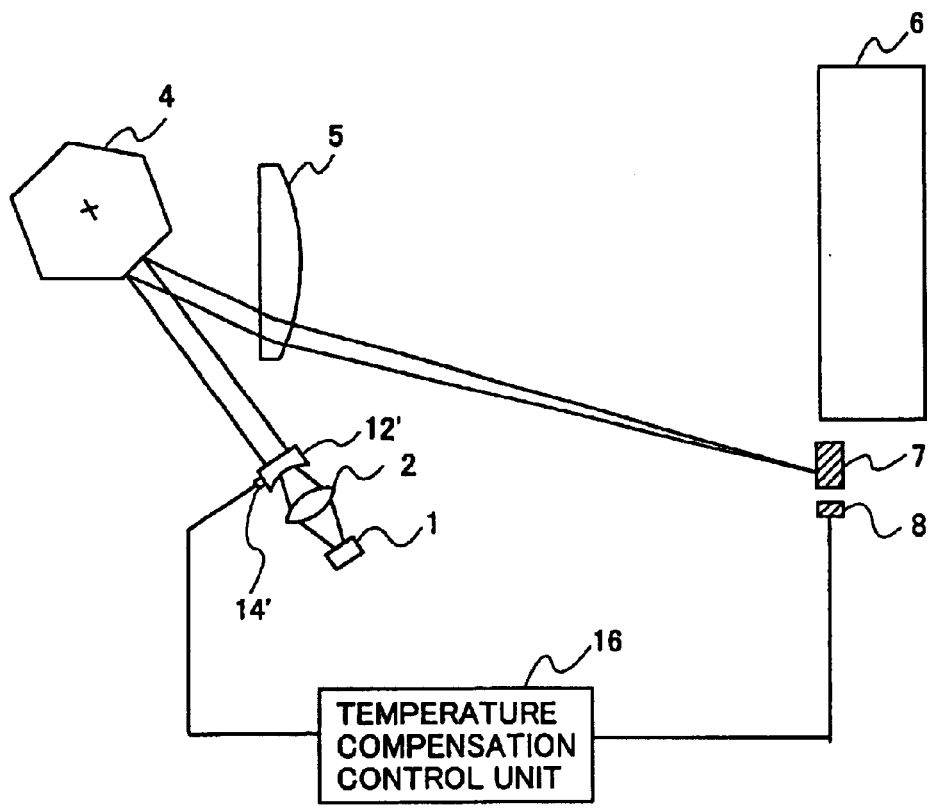
FIG. 6 is a schematic diagram showing a third preferred embodiment of the optical scanning device of the present invention.

Next, FIG. 6 shows a third preferred embodiment of the optical scanning device of the present invention.

As shown in FIG. 6, the optical scanning device of the present embodiment generally comprises the light source 1, the coupling lens 2, a second corrector lens 12', the deflector 4, the focusing lens system 5, the photosensitive medium 6, the sync signal detector 7, the temperature sensor 8, a second corrector lens actuator 14', and a temperature compensation control unit 16. In the present embodiment, the first corrector lens 11 and the first corrector lens actuator 13 as in the previous embodiment of FIG. 3 are omitted. In FIG. 6, the elements which are essentially the same as corresponding elements in FIG. 1 are designated by the same reference numerals, and a description thereof will be omitted.

In the optical scanning device of FIG. 6, the coupling lens 2, the deflector 4 and the focusing lens system 5 constitute the scanning optical unit in the claims, while the second corrector lens 12', the second corrector lens actuator 14' and the temperature compensation control unit 16 constitute the temperature compensation unit in the claims.

In the optical scanning device of FIG. 6, a light source module in which the light source 1 and the coupling lens 2 are accommodated is formed with a most suitable linear expansivity such that the focal-point deviation of the light beam on the scanned surface in the main scanning direction for the temperature change is made almost negligible or virtually equal to zero. Hence, the first corrector lens 11 and the first corrector lens actuator 13 as in the previous embodiment of FIG. 3 are omitted in the present embodiment.

In the optical scanning device of FIG. 6, the coupling lens 2 couples the light beam emitted by the light source 1, and the coupled light beam is suitably introduced to the second corrector lens 12'. The second corrector lens 12' provides a refraction power to the coupled light beam from the coupling lens 2, with respect to the sub-scanning direction. In the present embodiment, the focusing effect of the corrector lens 12' on the light beam from the light source 1 with respect to the sub-scanning direction is varied by the second corrector lens actuator 14' by a controlled amount of movement of the corrector lens 12' along the optical axis that corresponds to a detected temperature change. The movement of the corrector lens 12' by the second corrector lens actuator 14' is controlled by the temperature compensation control unit 16 in accordance with the temperature change. In the present embodiment, the sub-scanning-direction focal-point position of the light beam on the scanned surface of the photosensitive medium 6 is adjusted by the temperature compensation control unit 16 in accordance with the temperature change, so as to eliminate the focal-point deviation due to the temperature change. In the present embodiment, the light source module in which the light source 1 and the coupling lens 2 are accommodated is formed with the most suitable linear expansivity such that the focal-point deviation of the light beam on the scanned surface in the main scanning direction for the temperature change is made almost negligible.

The temperature compensation control unit 16 outputs a control signal to the second corrector lens actuator 14' in accordance with the signal supplied from the temperature sensor 8. The control signal output by the control unit 16 indicates a controlled amount of movement of the second corrector lens 12' required to cancel the focal-point deviation of the light beam in the sub-scanning direction due to the temperature change. The second corrector lens actuator 14' moves the second corrector lens 12' along the optical axis in accordance with the control signal supplied from the temperature compensation control unit 16. The temperature compensation control unit 16 controls the movement of the second corrector lens 12' in accordance with the temperature change detected by the temperature sensor 8. Therefore, the sub-scanning-direction focal-point position of the light beam on the scanned surface of the photosensitive medium 6 is adjusted by the temperature compensation control unit 16 so as to eliminate the focal-point deviation of the light beam with respect to the sub-scanning direction due to the temperature change.

In the present embodiment, the temperature-compensation control unit 16 includes a memory that stores a table defining the relationship between the temperature change and a corresponding focal-point deviation (with respect to the sub-scanning direction) of the light beam on the scanned surface. A simulation test of the optical scanning device of the present embodiment is performed, in advance, and individual scanned-surface focal-point deviations of the laser beam focused by the scanning optical unit are measured at different temperatures of the scanning optical unit. The table defining the above relationship is created based on the results of the measurement of the simulation test, and stored in the memory of the temperature-compensation control unit 16. During the measurement of the simulation test, the focusing effect of the corrector lens 12 on the light beam from the light source 1 is fixed to a reference level and not varied.

Figure 7:
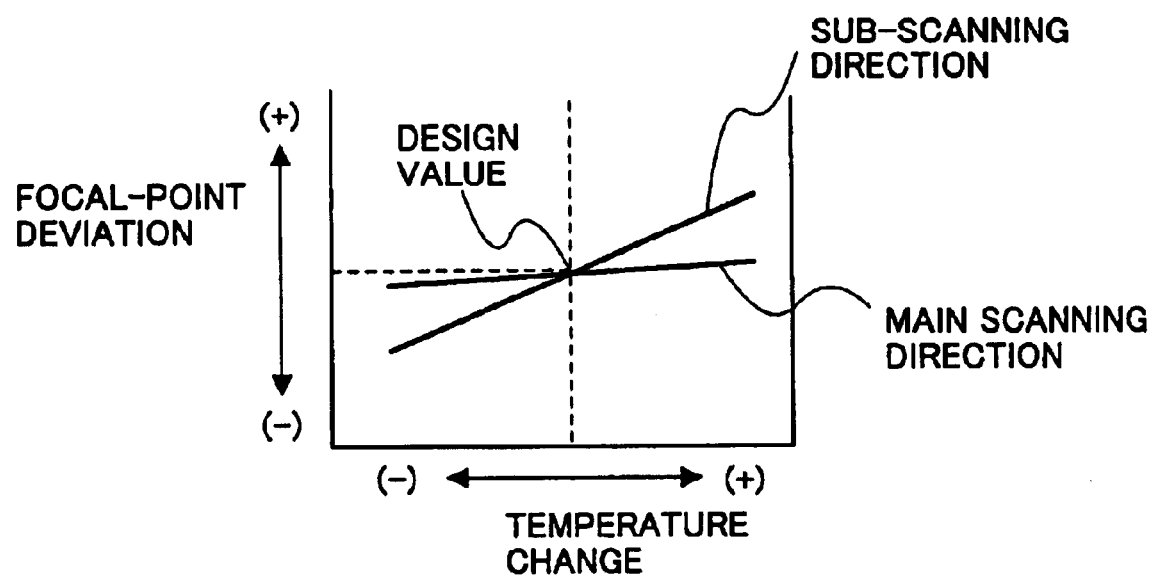
FIG. 7 is a diagram for explaining focal-point deviation characteristics of the optical scanning device of the present embodiment that are dependent on a temperature change.

FIG. 7 shows focal-point deviation characteristics of the optical scanning device of the present embodiment that are dependent on a temperature change.

In the optical scanning device of FIG. 6, when a temperature change of the scanning optical unit is detected by the temperature sensor 8, the temperature compensation control unit 16 adjusts the sub-scanning-direction focal-point position of the light beam based on the focal-point deviation read from the table of the memory (FIG. 7) in response to the temperature change. Specifically, the temperature compensation control unit 16 directly controls the corrector lens actuator 14' in accordance with the signal output from the temperature sensor 8, so that the focusing effect of the corrector lens 12' on the light beam from the light source 1 is directly varied by the controlled amount of movement of the second corrector lens 12' along the optical axis that correspond to the temperature change. The adjustment of the main-scanning-direction focal-point position of the light beam in accordance with the temperature change is not needed for the optical scanning device of the present embodiment.

It is not necessary for the optical scanning device of the present embodiment to perform the automatic focusing operation when the temperature of the scanning optical unit changes. In the present embodiment, it is possible to provide one-to-one correspondence between the temperature of the scanning optical unit and the corresponding amount of movement of the corrector lens 12'. The movement of the corrector lens 12' controlled by the temperature compensation control unit 16 results in the elimination of the focal-point deviation corresponding to that read from the memory. In the optical scanning device of the present embodiment, the temperature sensor 8, the corrector lens actuator 14' and the temperature compensation control unit 16 can be constructed in a simple, inexpensive configuration. The optical scanning device and the image forming apparatus of the present embodiment are effective in quickly achieving the optimum focal-point position of the light beam on the scanned surface of the photosensitive medium 6 when a temperature change of the scanning optical unit is detected.

In the above-described embodiment, the temperature sensor 8 is provided in the vicinity of the sync signal detector 7 as shown in FIG. 3. Alternatively, the temperature sensor 8 may be provided in the vicinity of the focusing lens system 5 or in the vicinity of the light source 1 which is subjected to significant temperature changes. Further, in order to increase the accuracy of temperature detection, a plurality of temperature sensors may be provided at different internal locations within the optical scanning device which are subjected to significant temperature changes.

In the above-described embodiments of FIG. 1, FIG. 3 and FIG. 6, the temperature sensor 8 is integrally formed on either an integrated circuit board in which the sync signal detector 7 or the deflector 4 is provided or an integrated circuit board in which the light source 1 (the laser diode) is provided. It is not necessary to provide an additional circuit board for mounting the temperature sensor 8 only in order to construct the optical scanning device of the present invention. The temperature compensation unit of the present invention can be constructed in a simple, inexpensive configuration.

In the above-described embodiment of FIG. 6, the first corrector lens 11 and the first corrector lens actuator 13 as in the previous embodiment of FIG. 3 are omitted, and the light source module in which the light source 1 and the coupling lens 2 are accommodated is formed with a most suitable linear expansivity such that the focal-point deviation of the light beam on the scanned surface in the main scanning direction for the temperature change is made almost negligible. However, the present invention is not limited to this embodiment. Alternatively, the second corrector lens 12 and the second corrector lens actuator 14 as in the previous embodiment of FIG. 3 may be omitted. In such alternative embodiment, the light source module in which the light source 1 and the coupling lens 2 are accommodated is formed with a most suitable linear expansivity such that the focal-point deviation of the light beam on the scanned surface in the sub-scanning direction for the temperature change is made almost negligible.

Figure 8:
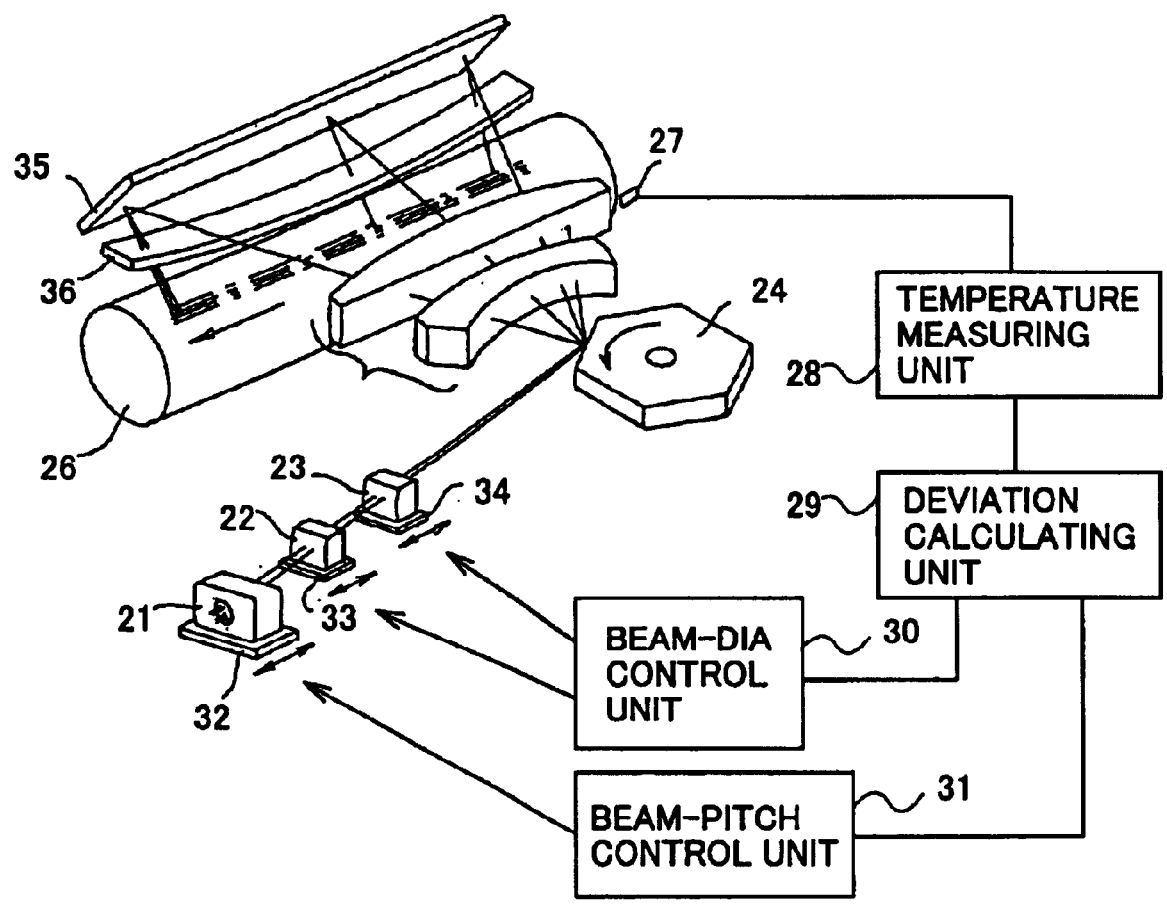
FIG. 8 is a schematic diagram showing a fourth preferred embodiment of the optical scanning device of the present invention.

Next, FIG. 8 shows a fourth preferred embodiment of the optical scanning device of the present invention.

As shown in FIG. 8, the optical scanning device of the present embodiment generally comprises a light source unit (also called the laser diode unit) 21, a first corrector lens 22, a second corrector lens 23, a deflector 24, a focusing lens system 25, a photosensitive medium 26, a temperature sensor 27, a temperature measuring unit 28, a deviation calculating unit 29, a beam-diameter control unit 30, a beam-pitch control unit 31, a first actuator 32, a second actuator 33, a third actuator 34, a reflector mirror 35, and a dust-proof glass 36. In the optical scanning device of FIG. 8, the deflector 24, the focusing lens system 25 and the reflector mirror 35 constitute the scanning optical unit in the claims, the temperature sensor 27 and the temperature measuring unit 28 constitute the temperature detection unit in the claims, while the first corrector lens 22, the second corrector lens 23, the first through third actuators 32–34, the deviation calculating unit 29, the beam-diameter control unit 30 and the beam-pitch control unit 31 constitute the temperature compensation unit in the claims.

In the optical scanning device of FIG. 8, the light source unit (or the laser diode unit) 21 includes a plurality of light sources (for example, laser diodes) which emit multiple light beams, such as multiple laser beams, in accordance with an image signal. The multiple light beams from the light source unit 21 are suitably introduced to the first corrector lens 22. The first actuator 32 moves the light source unit 21 along its optical axis in accordance with a control signal supplied from the beam-pitch control unit 31. The temperature compensation unit of the present embodiment controls the movement of the light source unit 21 by means of the first actuator 32 in accordance with a detected temperature change, and adjusts the beam pitch of the light beam on the scanned surface of the photosensitive medium 26 in the sub-scanning direction so as to eliminate the beam-pitch deviation caused by the temperature change.

The first corrector lens 22 provides a refraction power to the multiple light beams from the light source unit 21, with respect to the main scanning direction. The second corrector lens 23 provides a refraction power to the multiple light beams beam from the light source unit 21, with respect to the sub-scanning direction. The first and second corrector lenses 22 and 23 in the present embodiment are constituted by cylindrical lenses. The second actuator 33 moves the first corrector lens 22 along its optical axis in accordance with a control signal supplied from the beam-diameter control unit 30. The third actuator 34 moves the second corrector lens 23 along its optical axis in accordance with a control signal supplied from the beam-diameter control unit 30.

In the present embodiment, the focusing effect of the first corrector lens 22 on the multiple light beams from the light source unit 21 with respect to the main scanning direction is varied by the second actuator 33 by a controlled amount of movement of the first corrector lens 22 along the optical axis that corresponds to a temperature change. The focusing effect of the second corrector lens 23 on the multiple light beams from the light source unit 21 with respect to the sub-scanning direction is varied by the third actuator 34 by a controlled amount of movement of the second corrector lens 23 along the optical axis that corresponds to a temperature change. The movement of the first corrector lens 22 by the second actuator 33 and the movement of the second corrector lens 23 by the third actuator 34 are controlled by the beam-diameter control unit 30 in accordance with the temperature change.

Therefore, the temperature compensation unit of the present embodiment controls the movement of the first corrector lens 22 by means of the second actuator 33 in accordance with a detected temperature change, and adjusts the focal-point position of the light beam on the scanned surface of the photosensitive medium 26 in the main scanning direction so as to eliminate the main-scanning-direction focal-point deviation due to the temperature change. At the same time, the temperature compensation unit of the present embodiment controls the movement of the second corrector lens 23 by means of the third actuator 34 in accordance with the detected temperature change, and adjusts the focal-point position of the light beam on the scanned surface of the photosensitive medium 26 in the sub-scanning direction so as to eliminate the sub-scanning-direction focal-point deviation due to the temperature change.

Accordingly, the temperature compensation unit of the present embodiment adjusts each of the main-scanning-direction focal-point position, the sub-scanning-direction focal-point position and the sub-scanning-direction beam pitch related to the light beam on the scanned surface in accordance with a detected temperature change.

The deflector 24 in the present embodiment is a rotary polygonal mirror having reflection surfaces on the six peripheral sides. One of the reflection surfaces of the deflector 24 deflects the multiple light beams from the light source unit 21 at a single location while the deflector 24 is rotated around its rotation axis as indicated by the arrow in FIG. 8. The deflected beam from the deflector 24 scans the scanned surface of the photosensitive medium 26 in the main scanning direction (which is parallel to the axial direction of the photosensitive medium 26). In a synchronous manner with the time the main scanning is performed, the photosensitive medium 26 is rotated around its rotation axis by a given rotational angle. Hence, the photosensitive medium surface is scanned in the main scanning direction and in the sub-scanning direction by the light beam focused by the optical scanning device.

The focusing lens system 25 includes an fθ lens that converts the deflected light beam from the deflector 24 into a convergent light beam so that the convergent light beam from the focusing lens system 25 forms a light spot on the scanned surface of the photosensitive medium 26. The reflector mirror 35 reflects the convergent light beam, passed through the focusing lens system 25, to the scanned surface of the photosensitive medium 26. The dust-proof glass 36 is placed between the reflector mirror 35 and the photosensitive medium 26 to protect the scanned surface against dust. The reflected light beam from the reflector mirror 35 is allowed to pass through the dust-proof glass 36. During the rotation of the deflector 24, the light beam passed through the focusing lens system 25 scans the photosensitive medium surface in the main scanning direction.

In the optical scanning device of FIG. 8, the temperature sensor 27 is provided in the vicinity of the photosensitive medium 26. The temperature sensor 27 outputs a signal indicative of a temperature of the scanning optical unit and its neighboring locations, to the temperature measuring unit 28. When the temperature sensor 27 senses a first temperature of the scanning optical unit, the output signal of the temperature sensor 27 represents a first voltage or resistance of a thermoelectric element contained in the temperature sensor 27. When the temperature of the scanning optical unit changes to a second temperature and it is sensed by the temperature sensor 27, the output signal of the temperature sensor 27 represents a second voltage or resistance of the thermoelectric element. Hence, a change of the voltage or resistance of the thermoelectric element indicated by the output signal of the temperature sensor 27 is detected by the temperature measuring unit 28 as a change of the temperature sensed by the temperature sensor 27.

The temperature measuring unit 28 outputs a signal indicative of the temperature change to the deviation calculating unit 29. Based on the temperature change indicated by the output signal of the temperature measuring unit 28, the deviation calculating unit 29 respectively calculates a first amount of movement of the first corrector lens 22 required to cancel the main-scanning-direction focal-point deviation of the light beam (on the scanned surface) due to the temperature change, a second amount of movement of the second corrector lens 23 required to cancel the sub-scanning-direction focal-point deviation of the light beam (on the scanned surface) due to the temperature change, and a third amount of movement of the light source unit 21 required to cancel the sub-scanning-direction beam-pitch deviation of the light beam (on the scanned surface) due to the temperature change. The focal-point deviation calculating unit 28 supplies the calculated first and second amounts of the corrector lens movement to the beam-diameter control unit 30, and supplies the calculated third amount of the light source unit movement to the beam-pitch control unit 31.

As the third amount of the light source unit movement from the deviation calculating unit 29 is received at the beam-pitch control unit 31, the beam-pitch control unit 31 controls the movement of the light source unit 21 by means of the first actuator 32 in accordance with the detected temperature change, and adjusts the beam pitch of the light beam on the scanned surface of the photosensitive medium 26 in the sub-scanning direction so as to eliminate the beam-pitch deviation caused by the temperature change.

As the first and second amounts of the corrector lens movement from the deviation calculating unit 29 are received at the beam-diameter control unit 30, the beam-diameter control unit 30 respectively controls the movement of the first corrector lens 22 and the movement of the second corrector lens 23 by means of the second actuator 33 and the third actuator 34 in accordance with the detected temperature change, and respectively adjusts the main-scanning-direction focal-point position and the sub-scanning-direction focal-point position related to the light beam on the scanned surface of the photosensitive medium 26 so as to eliminate the main-scanning-direction and sub-scanning-direction focal-point deviations caused by the temperature change.

Next, a description will be provided of the calculation executed by the deviation calculating unit 29 in the present embodiment.

Figure 9:
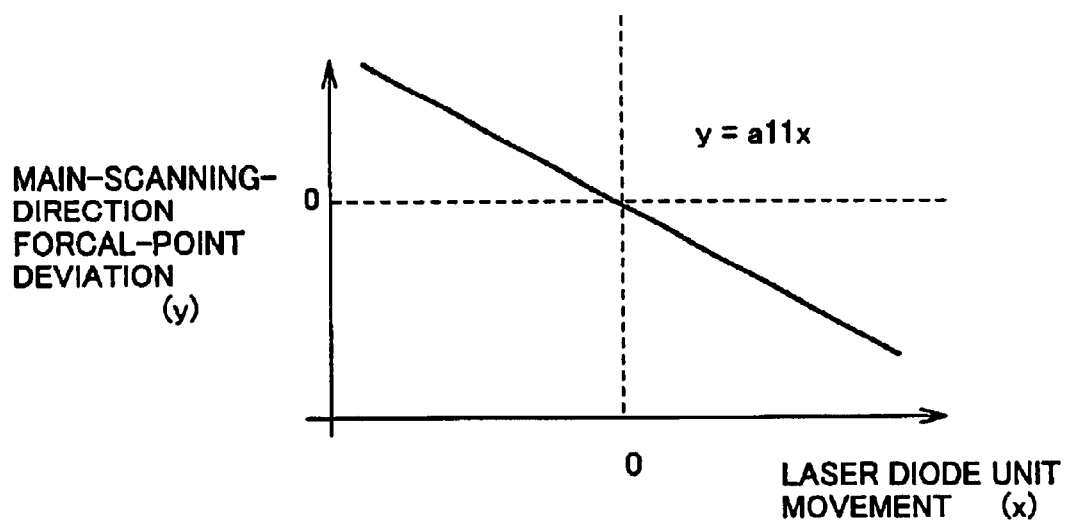
FIG. 9 is a diagram for explaining a relationship between main-scanning-direction focal-point deviation and laser-diode unit movement in the present embodiment.
Figure 10:
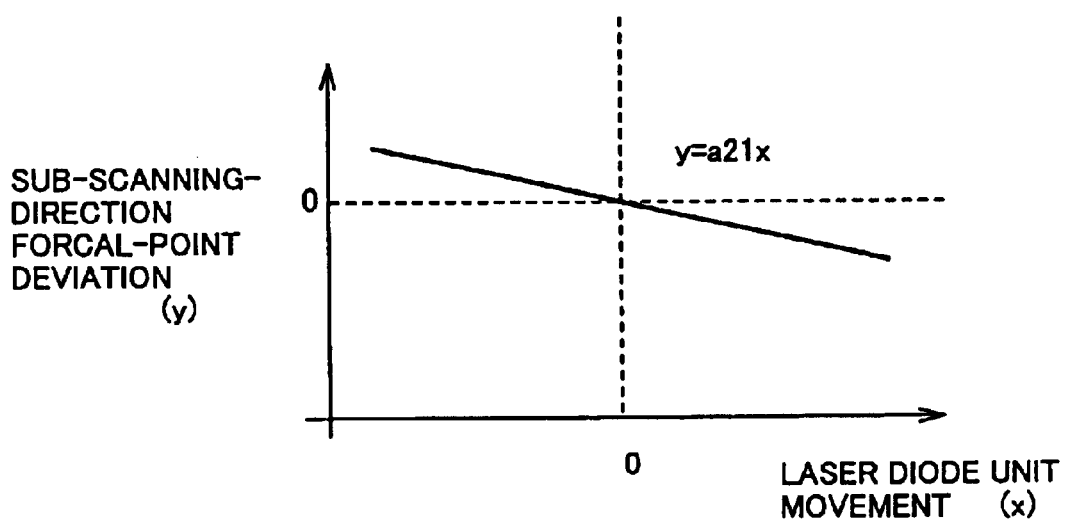
FIG. 10 is a diagram for explaining a relationship between sub-scanning-direction focal-point deviation and laser-diode unit movement in the present embodiment.
Figure 11:
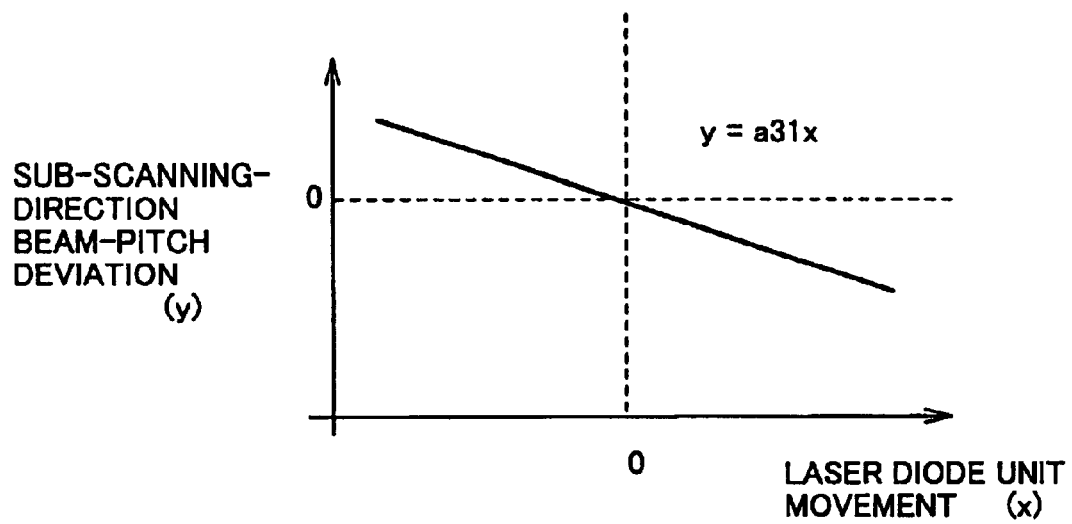
FIG. 11 is a diagram for explaining a relationship between sub-scanning-direction beam-pitch deviation and laser-diode unit movement in the present embodiment.

FIG. 9 shows a relationship between main-scanning-direction focal-point deviation and laser-diode unit movement in the present embodiment. In FIG. 9, "a11" indicates a gradient of the main-scanning-direction focal-point deviation to the laser-diode unit movement. FIG. 10 shows a relationship between sub-scanning-direction focal-point deviation and laser-diode unit movement in the present embodiment. In FIG. 10, "a21" indicates a gradient of the sub-scanning-direction focal-point deviation to the laser-diode unit movement. FIG. 11 shows a relationship between sub-scanning-direction beam-pitch deviation and laser-diode unit movement in the present embodiment. In FIG. 11, "a31" indicates a gradient of the sub-scanning-direction beam-pitch deviation to the laser-diode unit movement.

In the present embodiment, the deviation calculating unit 29 includes a memory that stores the gradient "a11" defining the relationship between main-scanning-direction focal-point deviation and laser-diode unit movement, the gradient "a21" defining the relationship between sub-scanning-direction focal-point deviation and laser-diode unit movement, and the gradient "a31" defining the relationship between sub-scanning-direction beam-pitch deviation and laser-diode unit movement, respectively. A simulation test (or actual measurement) of the optical scanning device of the present embodiment is performed, in advance, and individual scanned-surface focal-point (or beam-pitch) deviations of the laser beam focused by the scanning optical unit are measured at different amounts of movement of the laser-diode unit (or the light source unit 21). The gradients "a11", "a21" and "a31" defining the respective relationships are created based on the results of the measurement of the simulation test, and stored in the memory of the deviation calculating unit 29.

Figure 12:
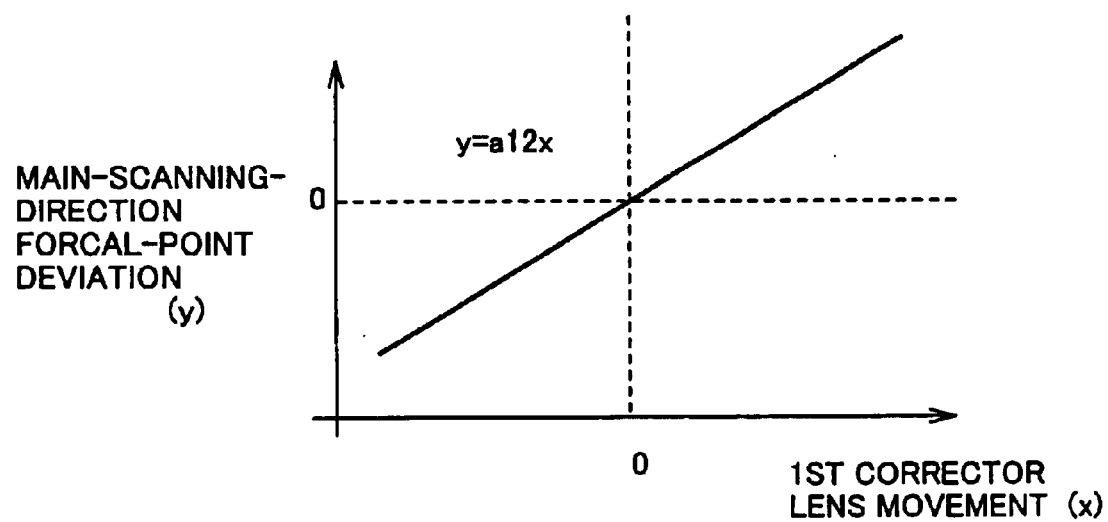
FIG. 12 is a diagram for explaining a relationship between main-scanning-direction focal-point deviation and first corrector lens movement in the present embodiment.
Figure 13:
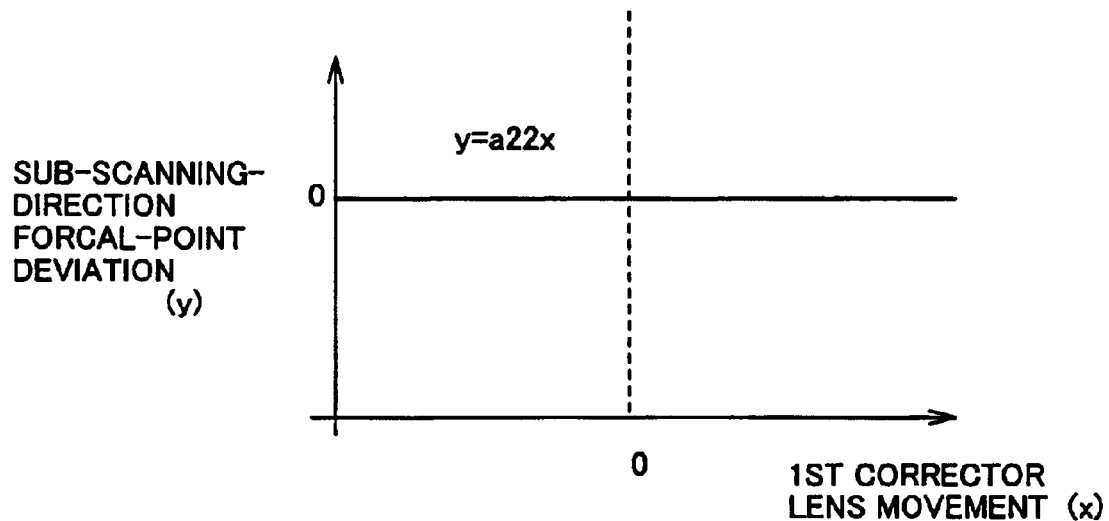
FIG. 13 is a diagram for explaining a relationship between sub-scanning-direction focal-point deviation and first corrector lens movement in the present embodiment.
Figure 14:
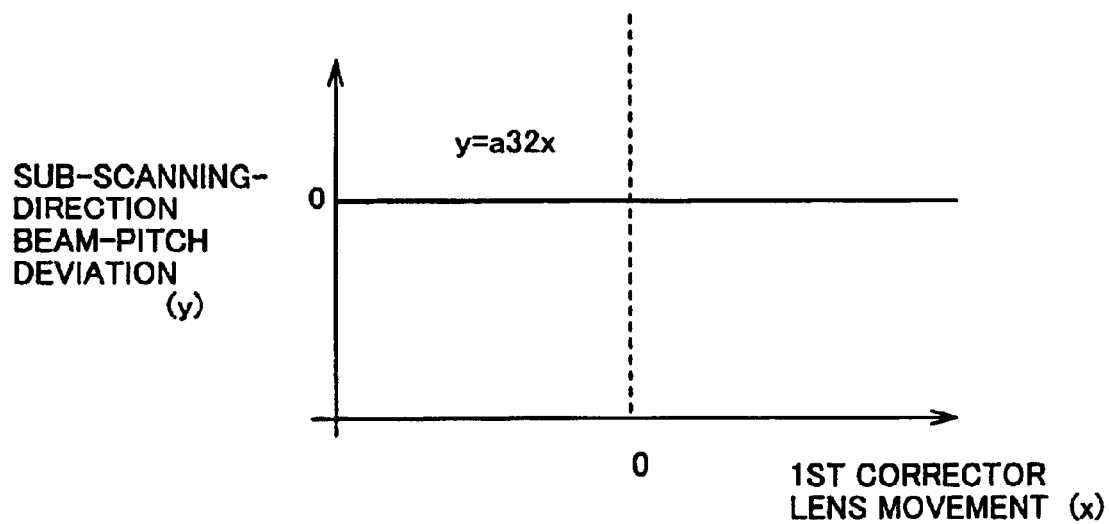
FIG. 14 is a diagram for explaining a relationship between sub-scanning-direction beam-pitch deviation and first corrector lens movement in the present embodiment.

Further, FIG. 12 shows a relationship between main-scanning-direction focal-point deviation and first corrector lens movement in the present embodiment. In FIG. 12, "a12" indicates a gradient of the main-scanning-direction focal-point deviation to the first corrector lens movement. FIG. 13 shows a relationship between sub-scanning-direction focal-point deviation and first corrector lens movement in the present embodiment. In FIG. 13, "a22" indicates a gradient of the sub-scanning-direction focal-point deviation to the first corrector lens movement. FIG. 14 shows a relationship between sub-scanning-direction beam-pitch deviation and first corrector lens movement in the present embodiment. In FIG. 14, "a32" indicates a gradient of the sub-scanning-direction beam-pitch deviation to the first corrector lens movement.

In the present embodiment, the memory of the deviation calculating unit 29 further stores the gradient "a12" defining the relationship between main-scanning-direction focal-point deviation and first corrector lens movement, the gradient "a22" defining the relationship between sub-scanning-direction focal-point deviation and first corrector lens movement, and the gradient "a32" defining the relationship between sub-scanning-direction beam-pitch deviation and first corrector movement, respectively. A simulation test (or actual measurement) of the optical scanning device of the present embodiment is performed, in advance, and individual scanned-surface focal-point (or beam-pitch) deviations of the laser beam focused by the scanning optical unit are measured at different amounts of movement of the first corrector lens 22. The gradients "a12", "a22" and "a32" defining the respective relationships are created based on the results of the measurement of the simulation test, and stored in the memory of the deviation calculating unit 29.

Figure 15:
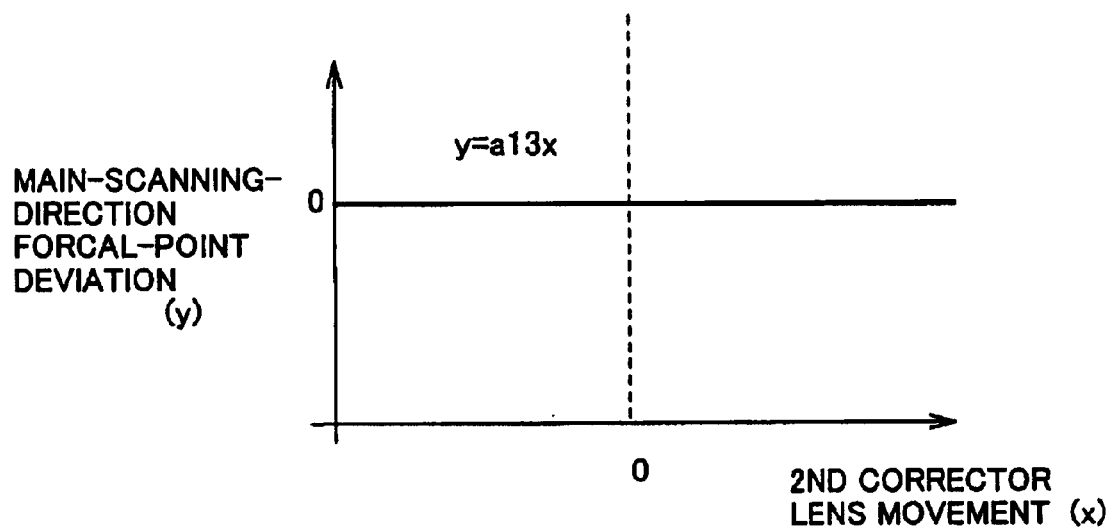
FIG. 15 is a diagram for explaining a relationship between main-scanning-direction focal-point deviation and second corrector lens movement in the present embodiment.
Figure 16:
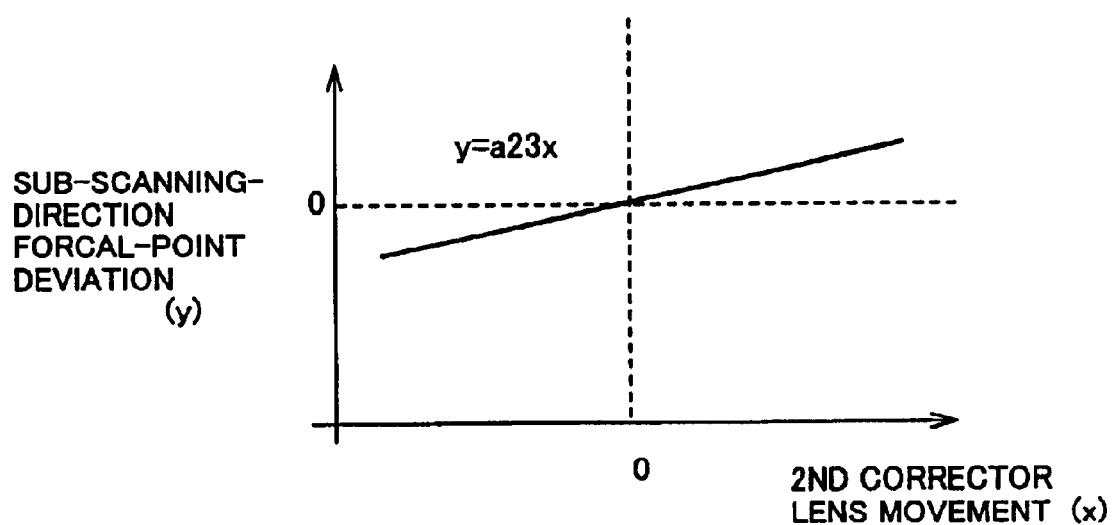
FIG. 16 is a diagram for explaining a relationship between sub-scanning-direction focal-point deviation and second corrector lens movement in the optical scanning device of the present embodiment.
Figure 17:
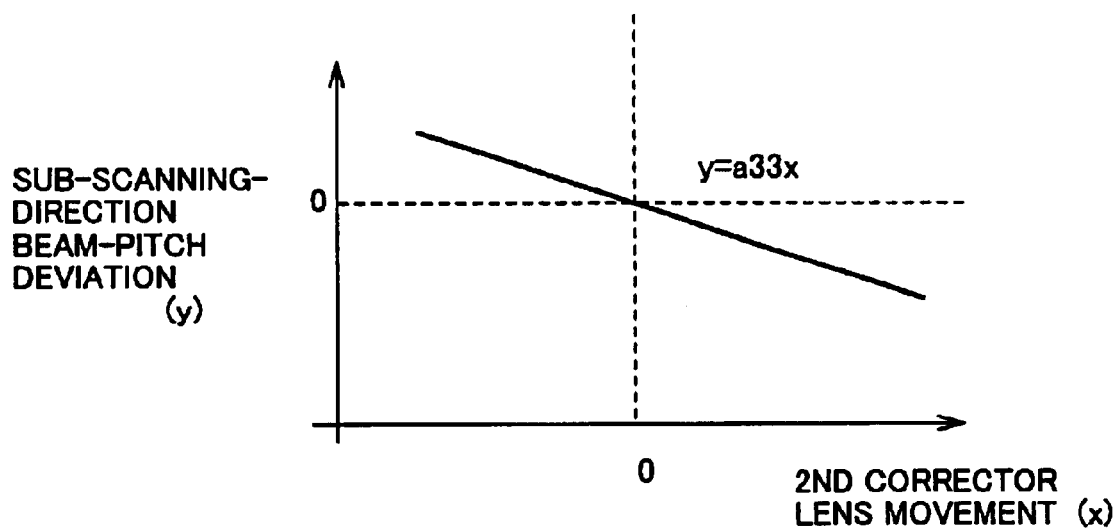
FIG. 17 is a diagram for explaining a relationship between sub-scanning-direction beam-pitch deviation and second corrector lens movement in the optical scanning device of the present embodiment.

Further, FIG. 15 shows a relationship between main-scanning-direction focal-point deviation and second corrector lens movement in the present embodiment. In FIG. 15, "a13" indicates a gradient of the main-scanning-direction focal-point deviation to the second corrector lens movement. FIG. 16 shows a relationship between sub-scanning-direction focal-point deviation and second corrector lens movement in the optical scanning device of the present embodiment. In FIG. 16, "a23" indicates a gradient of the sub-scanning-direction focal-point deviation to the second corrector lens movement. FIG. 17 shows a relationship between sub-scanning-direction beam-pitch deviation and second corrector lens movement in the optical scanning device of the present embodiment. In FIG. 13, "a33" indicates a gradient of the sub-scanning-direction beam-pitch deviation to the second corrector lens movement.

In the present embodiment, the memory of the deviation calculating unit 29 further stores the gradient "a13" defining the relationship between main-scanning-direction focal-point deviation and second corrector lens movement, the gradient "a23" defining the relationship between sub-scanning-direction focal-point deviation and second corrector lens movement, and the gradient "a33" defining the relationship between sub-scanning-direction beam-pitch deviation and second corrector movement, respectively. A simulation test (or actual measurement) of the optical scanning device of the present embodiment is performed, in advance, and individual scanned-surface focal-point (or beam-pitch) deviations of the laser beam focused by the scanning optical unit are measured at different amounts of movement of the second corrector lens 23. The gradients "a13", "a23" and "a33" defining the respective relationships are created based on the results of the measurement of the simulation test, and stored in the memory of the deviation calculating unit 29.

In the present embodiment, the memory of the deviation calculating unit 29 stores a first map defining a relationship between temperature change and a corresponding main-scanning-direction focal-point deviation of the laser beam, a second map defining a relationship between temperature change and a corresponding sub-scanning-direction focal-point deviation of the laser beam, and a third map defining a relationship between temperature change and a corresponding sub-scanning-direction beam-pitch deviation of the light beam, respectively. A simulation test of the optical scanning device of the present embodiment is performed, in advance, and individual scanned-surface focal-point (or beam-pitch) deviations of the laser beam focused by the scanning optical unit are measured at different temperatures of the scanning optical unit. The first through third maps defining the respective relationships are created based on the results of the measurement of the simulation test, and stored in the memory of the deviation calculating unit 29. During the measurement of the simulation test, the focusing effect of the corrector lenses 22 and 23 on the multiple light beams from the light source unit 21 is fixed to a reference level and not varied.

Figure 18:
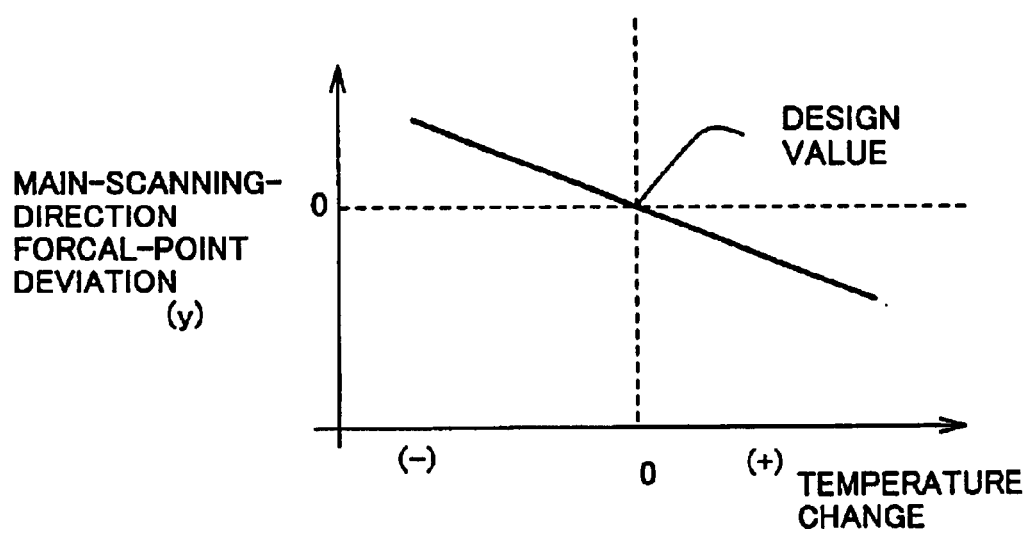
FIG. 18 is a diagram for explaining a relationship between main-scanning-direction focal-point deviation of the optical scanning device of the present embodiment and temperature change.
Figure 19:
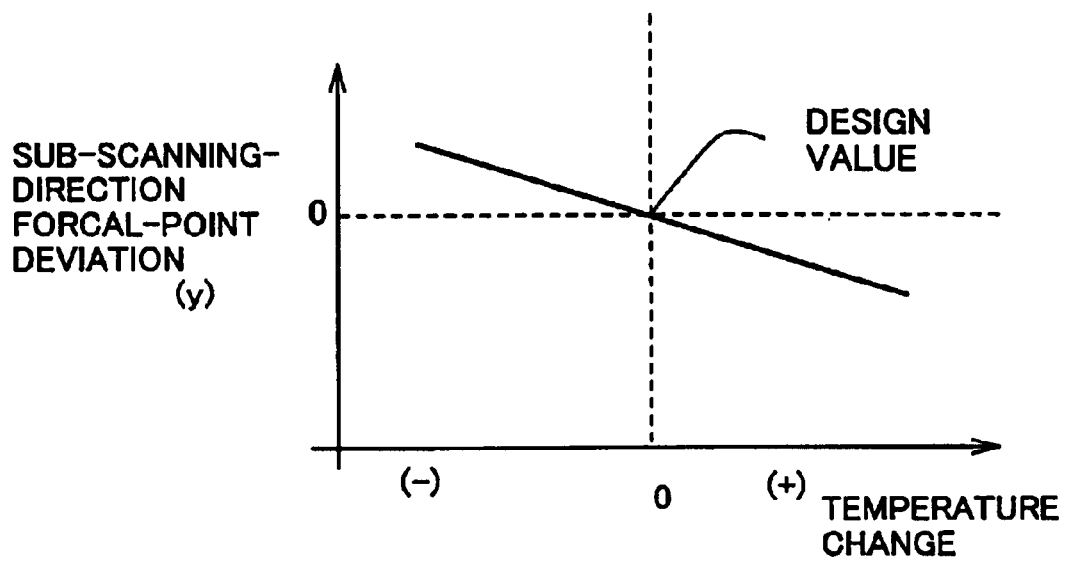
FIG. 19 is a diagram for explaining a relationship between sub-scanning-direction focal-point deviation of the optical scanning device of the present embodiment and temperature change.
Figure 20:
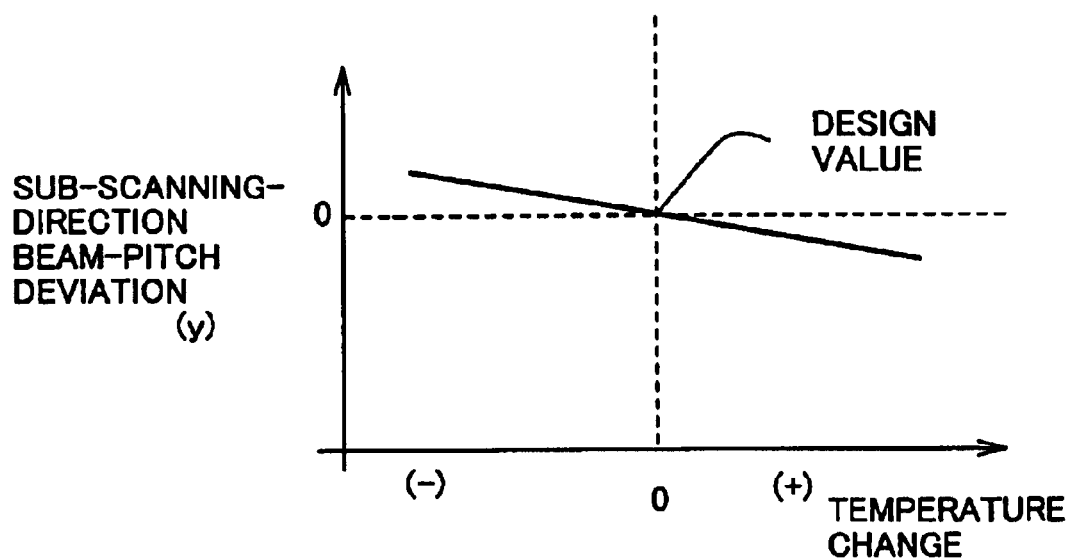
FIG. 20 is a diagram for explaining a relationship between sub-scanning-direction beam-pitch deviation of the optical scanning device and temperature change.

FIG. 18 shows a relationship between main-scanning-direction focal-point deviation of the optical scanning device of the present embodiment and temperature change. FIG. 19 shows a relationship between sub-scanning-direction focal-point deviation of the optical scanning device of the present embodiment and temperature change. FIG. 20 shows a relationship between sub-scanning-direction beam-pitch deviation of the optical scanning device of the present embodiment and temperature change.

Suppose that "M" denotes a main-scanning-direction focal-point deviation of the light beam on the scanned surface for a temperature change, "S" denotes a sub-scanning-direction focal-point deviation of the light beam on the scanned surface for the temperature change, and "P" denotes a sub-scanning-direction beam-pitch deviation of the light beam on the scanned surface for the temperature change. Further, suppose that "X1" denotes a first amount of movement of the first corrector lens 22 along the optical axis needed to cancel the deviation due to the temperature change, "X2" denotes a second amount of movement of the second corrector lens 23 along the optical axis needed to cancel the deviation due to 10 the temperature change, and "X3" denotes a third amount of movement of the laser-diode unit 21 along the optical axis needed to cancel the deviation due to the temperature change. Then, the following formula is satisfied.

$$\begin{bmatrix} M \\ S \\ P \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} X1 \\ X2 \\ X3 \end{bmatrix}$$

From the above formula, the respective amounts "X1", "X2" and "X3" of the corrector tens movement and the laser-diode unit movement that must be achieved in order to eliminate the focal-point and beam-pitch deviations due to the temperature change, are calculated as follows.

$$\begin{bmatrix} X1 \\ X2 \\ X3 \end{bmatrix} = \begin{bmatrix} a_{11} & a_{12} & a_{13} \\ a_{21} & a_{22} & a_{23} \\ a_{31} & a_{32} & a_{33} \end{bmatrix}^{-1} \begin{bmatrix} M \\ S \\ P \end{bmatrix}$$

In the present embodiment, by using the above formula, the deviation calculating unit 29 calculates the first amount X1 of movement of the first corrector lens 22, the second amount X2 of movement of the second corrector lens 23, and the third amount X3 of movement of the light source unit 21, respectively, from the stored gradient matrix (a11 through a33) and the respective deviations M, S and P of the first, second and third maps read from the memory in response to the temperature change.

As described above, in the present embodiment, the simulation test is performed, in advance, such that individual scanned-surface focal-point or beam-pitch deviations of the laser beam focused by the scanning optical unit are measured at different temperatures of the scanning optical unit. The first through third maps defining the respective relationships are created based on the results of the measurement of the simulation test, and the maps, such as shown in FIG. 18 through FIG. 20, are stored in the memory of the deviation calculating unit 29.

Accordingly, in the optical scanning device of FIG. 8, when a temperature change of the scanning optical unit is detected by the temperature measuring unit 28, the beam-diameter control unit 30 adjusts each of the main-scanning-direction focal-point position and the sub-scanning-direction focal-point position of the light beam on the scanned surface by varying the focusing effect of the first corrector lens 22 on the light-source-emission light beam by the first amount X1 of movement of the first corrector lens 22 along the optical axis, which corresponds to the temperature change and is supplied from the deviation calculating unit 29, and varying the focusing effect of the second corrector leans 23 on the light-source-emission light beam by the second amount X2 of movement of the second corrector lens 23 along the optical axis, which corresponds to the temperature change and is supplied from the deviation calculating unit 29. At the same time, the beam-pitch control unit 31 adjusts the sub-scanning-direction beam pitch of the light beam on the scanned surface by moving the light source unit 21 along the optical axis by the third amount X3, which corresponds to the temperature change and is supplied from the deviation calculating unit 29.

It is not necessary for the optical scanning device of the present embodiment to perform the automatic focusing operation when the temperature of the scanning optical unit changes. In the present embodiment, it is possible to provide one-to-one correspondence between the temperature of the scanning optical unit and the corresponding amount of movement of each of the light source unit 21, the first corrector lens 22 and the second corrector lens 23.

The movement of each of the first corrector lens 22 and the second corrector lens 23 controlled by the beam-diameter control unit 30 results in the elimination of the focal-point deviation corresponding to that read from the memory of the deviation calculating unit 29 in response to the temperature change. The movement of the light source unit 21 controlled by the beam-pitch control unit 31 results in the elimination of the beam-pitch deviation corresponding to that read from the memory of the deviation calculating unit 29 in response to the temperature change. In the optical scanning device of the present embodiment, the temperature compensation unit can be constructed in a simple, inexpensive configuration. The optical scanning device and the image forming apparatus of the present embodiment are effective in quickly achieving the optimum focal-point position and the optimum beam pitch of the light beam on the scanned surface of the photosensitive medium 6 when a temperature change of the scanning optical unit is detected.

In the above-described embodiment, the temperature sensor 27 is provided in the vicinity of the photosensitive medium 26 as shown in FIG. 8. The present invention is not limited to this embodiment. In order to increase the accuracy of temperature detection, a plurality of temperature sensors may be provided at different internal locations within the optical scanning device which are subjected to significant temperature changes. In such embodiment, the temperature measuring unit 28 detects the temperature of the scanning optical unit and its neighboring locations by obtaining a weighted average of respective temperatures sensed by the plurality of temperature sensors. The weighting factors of the temperature sensors for use in the calculation of the weighted average may be determined depending on the location of each temperature sensor. As the focusing lens system 25 and the light source unit 21 are significantly affected by temperature changes, it is necessary to assign a relatively large weighting factor for the temperature sensors if they are provided in the vicinity of the focusing lens system 25 or the light source unit 21.

The optical scanning device of the above-described embodiment is provided in an image forming apparatus in which an image is formed through an electrophotographic printing process. In the electrophotographic printing process, there are basically six major steps employed: (1) charging of the photosensitive medium; (2) exposing of the photosensitive medium to the image light pattern; (3) developing of the photosensitive medium with toner; (4) transferring of the toned image from the photosensitive medium to the final medium (usually paper); (5) thermal fusing of the toner to the paper; and (6) cleaning of residual toner from the photosensitive medium surface. The scanning of the photoconductive medium surface, performed by the light beam from the optical scanning device of the above-described embodiment, corresponds to the exposing step of the electrophotographic printing process that is carried out by the image forming apparatus.

The present invention is not limited to the above-described embodiment, and variations and modifications may be made without departing from the scope of the present invention.

Further, the present invention is based on japanese priority application No. 11-333510, filed on Nov. 24, 1999, and Japanese priority application No. 2000-023930, filed on Feb. 1, 2000, the entire contents of which are hereby incorporated by reference.

What is claimed is:

1. An optical scanning device comprising:
   a light source emitting a light beam;
   a scanning optical unit deflecting the light beam from the light source and focusing the deflected light beam to form a light spot on a scanned surface, the scanned surface being scanned by the light beam from the scanning optical unit;
   a temperature detection unit detecting a temperature of the scanning optical unit and its neighboring locations; and
   a temperature compensation unit adjusting a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change,
   wherein the scanning optical unit comprises a coupling lens coupling the light beam from the light source, and the corrector lens of the temperature compensation unit providing a refraction power to the coupled light beam in a main scanning direction or a sub-scanning direction on the scanned surface independently.

2. The optical scanning device according to claim 1, wherein the temperature compensation unit adjusts the focal-point position of the light beam with respect to at least one of a main scanning direction and a sub-scanning direction in accordance with the temperature change.

3. An optical scanning device comprising:

a light source emitting a light beam;

a scanning optical unit deflecting the light beam from the light source and focusing the deflected light beam to form a light spot on a scanned surface, the scanned surface being scanned by the light beam from the scanning optical unit;

a temperature detection unit detecting a temperature of the scanning optical unit and its neighboring locations; and a temperature compensation unit adjusting a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change, wherein the temperature compensation unit includes a memory that stores a table defining a relationship between the temperature change and a corresponding focal-point deviation of the light beam on the scanned surface, the temperature compensation unit adjusting the focal-point position of the light beam based on the focal-point deviation read from the memory in response to the temperature change, and wherein the scanning optical unit comprises a coupling lens coupling the light beam from the light source, and the corrector lens of the temperature compensation unit providing a refraction power to the coupled light beam in a main scanning direction or a sub-scanning direction on the scanned surface independently.

4. An optical scanning device comprising:

a light source emitting a light beam;

a scanning optical unit deflecting the light beam from the light source and focusing the deflected light beam to form a light spot on a scanned surface, the scanned surface being scanned by the light beam from the scanning optical unit;

a temperature detection unit detecting a temperature of the scanning optical unit and its neighboring locations; and a temperature compensation unit adjusting a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change, wherein an integrated circuit board having a function that is different from a temperature compensation function is provided, the temperature detection unit being integrally formed on the integrated circuit board, and wherein the scanning optical unit comprises a coupling lens coupling the light beam from the light source, and the corrector lens of the temperature compensation unit providing a refraction power to the coupled light beam in a main scanning direction or a sub-scanning direction on the scanned surface independently.

5. An optical scanning method comprising the steps of:

emitting a light beam from a light source;

deflecting the light beam from the light source by a scanning optical unit;

focusing the deflected light beam by the scanning optical unit to form a light spot on a scanned surface, the scanned surface being scanned by the light beam from the scanning optical unit;

detecting a temperature of the scanning optical unit and its neighboring locations; and adjusting a focal-point position of the light beam on the scanned surface in accordance with a change in the temperature detected in the detecting step, the focal-point position of the light beam being adjusted by directly varying a focusing effect of a corrector lens on the light beam from the light source by a controlled amount of movement of the corrector lens along its optical axis that corresponds to the temperature change, wherein the scanning optical unit comprises a coupling lens coupling the light beam from the light source, and the corrector lens providing a refraction power to the coupled light beam in a main scanning direction or a sub-scanning direction on the scanned surface independently.

6. An image forming apparatus in which an optical scanning device is provided, the optical scanning device comprising:

a light source emitting a light beam;

a scanning optical unit deflecting the light beam from the light source and focusing the deflected light beam to form a light spot on a scanned surface, the scanned surface being scanned by the light beam from the scanning optical unit;

a temperature detection unit detecting a temperature of the scanning optical unit and its neighboring locations; and a temperature compensation unit adjusting a focal-point position of the light beam on the scanned surface in accordance with a change in the temperature detected by the temperature detection unit, the temperature compensation unit adjusting the focal-point position of the light beam by directly varying a focusing effect of a corrector lens on the light beam from the light source by a controlled amount of movement of the corrector lens along its optical axis that corresponds to the temperature change, wherein the scanning optical unit comprises a coupling lens coupling the light beam from the light source, and the corrector lens of the temperature compensation unit providing a refraction power to the coupled light beam in a main scanning direction or a sub-scanning direction on the scanned surface independently.

* * * * *